US010302751B2

(12) United States Patent
Dewey

(10) Patent No.: US 10,302,751 B2
(45) Date of Patent: May 28, 2019

(54) A-MODE ULTRASONIC CLASSIFIER

(71) Applicant: Russell H. Dewey, Los Altos, CA (US)

(72) Inventor: Russell H. Dewey, Los Altos, CA (US)

( * ) Notice: Subject to any disclaimer, the term of this patent is extended or adjusted under 35 U.S.C. 154(b) by 145 days.

(21) Appl. No.: 15/454,190

(22) Filed: Mar. 9, 2017

(65) Prior Publication Data
US 2018/0259631 A1  Sep. 13, 2018

(51) Int. Cl.
*G03B 42/06* (2006.01)
*G01S 7/52* (2006.01)

(52) U.S. Cl.
CPC ........ *G01S 7/52058* (2013.01); *G01S 7/5206* (2013.01); *G01S 7/52055* (2013.01); *G01S 7/52084* (2013.01)

(58) Field of Classification Search
None
See application file for complete search history.

(56) References Cited

U.S. PATENT DOCUMENTS

| | | | |
|---|---|---|---|
| 4,156,304 A | 5/1979 | Lee | |
| 4,230,124 A | 10/1980 | Pickering et al. | |
| 4,233,989 A | 11/1980 | Larach et al. | |
| 4,745,475 A | 5/1988 | Bicknell et al. | |
| 5,601,082 A | 2/1997 | Barlow et al. | |
| 5,765,029 A | 6/1998 | Schweid et al. | |
| 6,056,690 A | 5/2000 | Roberts | |
| 6,210,327 B1 * | 4/2001 | Brackett | G06F 19/321 600/407 |
| 6,301,512 B1 | 10/2001 | Motzer | |
| 6,388,687 B1 * | 5/2002 | Brackett | H04N 1/00416 709/201 |
| 6,687,383 B1 | 2/2004 | Kanevsky et al. | |
| 6,760,755 B1 * | 7/2004 | Brackett | H04L 29/06 709/214 |
| 6,928,181 B2 | 8/2005 | Brooks | |
| 7,116,807 B1 * | 10/2006 | Brackett | G06F 19/321 382/128 |
| 7,472,598 B2 | 1/2009 | Kleinert | |
| 7,478,569 B2 | 1/2009 | Bossi et al. | |
| 7,516,022 B2 | 4/2009 | Lee et al. | |
| 7,917,317 B2 | 3/2011 | McKeon | |
| 2005/0053305 A1 * | 3/2005 | Li | A61B 8/00 382/260 |

(Continued)

OTHER PUBLICATIONS

NN86112726. Use of Symmetrized-Dot Patterns in the Characterization and Detection of Cardiac Abnormalities. IBM Technical Disclosure Bulletin, Nov. 1986, US. vol. No. 29. Issue No. 6. p. 2726-2731. Publication-Date: Nov. 1, 1986 (Nov. 1, 1986). (Year: 1986).*

(Continued)

*Primary Examiner* — Isam A Alsomiri
*Assistant Examiner* — Jonathan D Armstrong

(57) ABSTRACT

The disclosed invention is a computer-implemented process that identifies and extracts distinctive data characteristics from a linear array of time-sequenced A-mode ultrasonic backscatter amplitude data, where such distinctive data characteristics are indicative of material identity. The disclosed invention uses such distinctive data characteristics to create a plausible inference about whether or not an investigatory material belongs to a specific class of ultrasonically permeable materials of known classification.

4 Claims, 4 Drawing Sheets

(56) References Cited

U.S. PATENT DOCUMENTS

| | | | | |
|---|---|---|---|---|
| 2013/0281819 A1* | 10/2013 | Schmid | ............... | A61B 5/0095 |
| | | | | 600/407 |
| 2014/0039311 A1 | 2/2014 | Dewey | | |
| 2015/0257731 A1* | 9/2015 | Abe | ..................... | A61B 8/0883 |
| | | | | 600/443 |
| 2015/0320395 A1* | 11/2015 | Sato | ........................ | A61B 8/06 |
| | | | | 600/455 |

OTHER PUBLICATIONS

Pickover, Clifford A. On the use of symmetrized dot patterns for the visual characterization of speech waveforms and other sampled data. The Journal of the Acoustical Society of America. 80.3 (1986): 955-960. (Year: 1986).*

Pickover, C. A., "Computers, Pattern, Chaos and Beauty", Sep. 1991, pp. 37-45, Unusual Graphic Representations, symmetrized dot patterns, St Martin's Press, New York.

Mashford, et al., "An Approach to Hydraulic Machine Evaluation Using Classification of Symmetrised Dot Patterns", proceedings SETE 2007, on Complex Systems and Sustainability, Sydney, Australia.

* cited by examiner

A-MODE ULTRASONIC CLASSIFIER

The present application claims priority to the earlier filed provisional application having Ser. No. 62/312,918, and hereby incorporates subject matter of the provisional application in its entirety.

BACKGROUND

Field of Invention

This invention relates to the field of computer-based systems having processes therein that classify materials, specifically such systems making classification decisions based on A-mode ultrasonic backscatter data signatures, and more specifically by comparing A-mode ultrasonic backscatter data signatures extracted from an investigatory material to A-mode ultrasonic backscatter data signatures extracted from a control material of known classification.

Description of Prior Art

The book, "Computers, Patterns, Chaos and Beauty", by Clifford Pickover, published by St. Martin's Press, New York, September 1991, pages 37-45 contains a method known in the art for creating a visual symmetrized dot pattern (SDP) scatter plot from a linear array of digital acoustic waveform data. The present invention incorporates the referenced Pickering algorithm for a new use, namely to create a computer processable symmetrized dot pattern (SDP) scatter plot from a vector of high-frequency non-acoustic A-mode ultrasonic backscatter data.

U.S. Pat. No. 9,585,638 B2 (Dewey, et al.) discloses "A SYSTEM FOR CLASSIFYING PALPABLE SOFT TISSUE MASSES USING A-MODE ECHOGRAPHS." The present invention improves on the referenced U.S. Pat. No. 9,585,638 B2 by teaching a different computer-implemented process for classifying materials using A-mode ultrasonic backscatter data arrays. The improvements are summarized as follows:

a) In U.S. Pat. No. 9,585,638 B2, Claim 1 is limited in its scope to a "system for classifying palpable breast masses using digital A-mode Echographs." In contrast, the Claims in the present amended application are not limited to palpable breast masses and are not limited to using digital A-mode Echographs;

b) In U.S. Pat. No. 9,585,638 B2, Claim 1b, Step 5 is limited to "approximating an a-scan amplitude-time area for the data vector from step 4 by summing all of the digital time-sampled amplitude values from step 4, In contrast, The Claims in the present amended application are not so limited. The present amended application teaches a specific transformation of A-mode data into polar coordinate SDP data arrays followed by a specific transformation of SDP data arrays into raster-type x-y data arrays;

c) In U.S. Pat. No. 9,585,638 B2, Claim 1b, Step 6 is limited to "calculating an A-mode area ratio by dividing the a-scan amplitude-time area by a global constant representing a threshold amplitude-time area for discriminating abnormal masses from non-abnormal masses." In contrast, the Claims of the present amended invention are not so limited. The present amended application teaches specific steps for discriminating an investigatory material from a control material by identifying and extracting a specific a-Mode data signature based on measuring the similarity between a raster-type x-y data array of an investigatory material and a raster-type x-y data array of a control material;

d) In U.S. Pat. No. 9,585,638 B2, Claim 1b, Step 7 is limited to "deciding on whether an observed mass is likely abnormal or likely non-abnormal, using the following logic: when the a-scan area ratio is greater than 1.0, consider an observed mass to be likely abnormal; otherwise consider the observed mass to be likely not abnormal," In contrast, the Claims of the present amended invention are not so limited. The present amended application teaches specific steps for deriving a classification decision based on the following logic—higher measures of data similarity are indicative of a higher belief that the investigatory material belongs to the same class as the control material;

e) In U.S. Pat. No. 9,585,638 B2, Claim 1b, Step 8 is limited to communicating the classification decision to a system user in the form of exactly two colored text boxes indicating the breast mass is either normal or abnormal. In contrast, the Claims of the present amended invention are not so limited to such a Boolean outcome. The present invention teaches a method of indicating a level of plausibility or credibility that the investigatory material and the control material belong in the same class.

Objects and Advantages

One object of the present invention is to improve the content and acuity of visual images of A-mode data, and thereby improve the speed and accuracy of visually interpreting A-mode data. Another object of the present invention is to improve the speed and accuracy of interpreting A-mode data by automated reasoning methods.

BRIEF SUMMARY OF THE INVENTION

The disclosed invention is a computer-implemented process that extracts distinctive characteristics (signatures) from a one-dimensional vector of A-mode ultrasonic backscatter data, where such distinctive data characteristics are indicative of material identity. The disclosed computer-implemented process includes steps for using such distinctive data characteristics to create a plausible inference about whether or not an investigatory material belongs to a specific class of ultrasonically permeable materials.

BRIEF DESCRIPTION OF THE SEVERAL VIEWS OF THE DRAWINGS

The invention will be described in conjunction with the accompanying drawings, in which.

BRIEF LISTING OF REFERENCE NUMERALS

Figure 1:
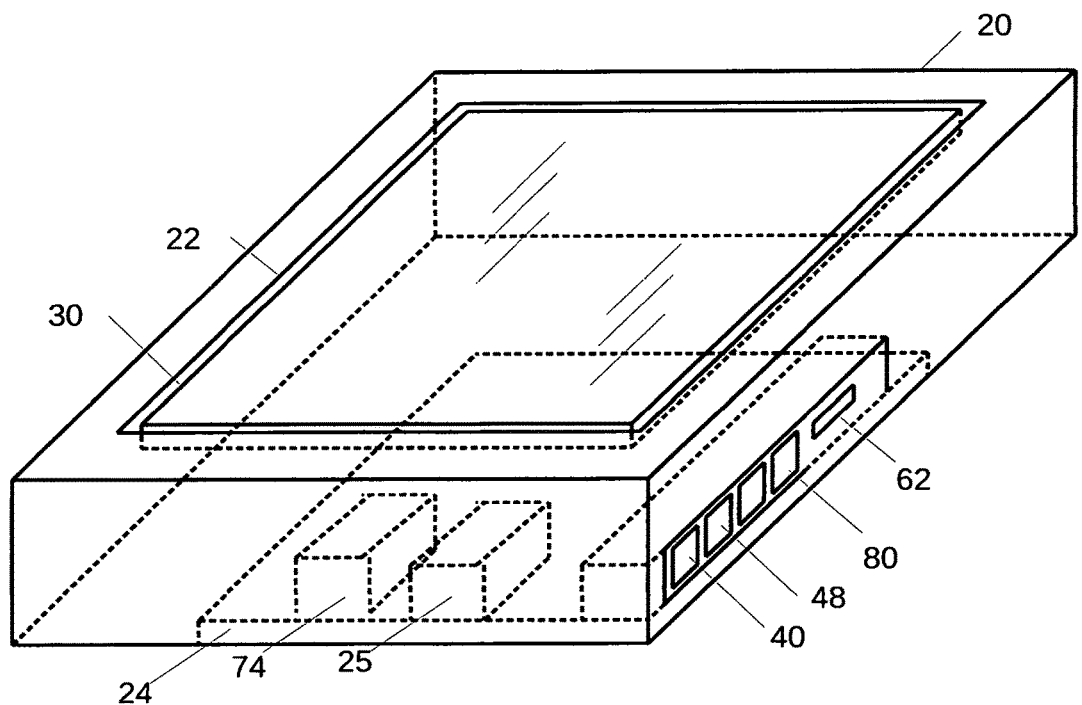
FIG. 1 is a block diagram illustrating an exemplary embodiment for the present invention.

020 enclosure
022 aperture
024 single-board computer
025 processor 030 visual display device
040 serial data connectors
048 parallel data connectors
062 removable media slots
074 digital recording device
080 data network connector
104 input data file
106 waveform data vector
107 Pruned Waveform Vector
108 envelope data vector
112 filtered envelope data vector
115 investigatory material SDP data array
116 control material SDP image data array
117 SDP difference data array
118 SDP similarity count

BRIEF SUMMARY OF TERMS USED IN
DESCRIBING THE INVENTION

For the purposes of the present invention, it is advantageous to first define several terms before describing the invention. It should be appreciated that the following definitions are used throughout this application. Where the definition of terms departs from the commonly used meaning of the term, applicant intends to utilize the definitions provided below, unless specifically indicated.

The term A-mode data vector as used herein is intended to mean a time-ordered finite-element one-dimensional vector in which each element in the vector represents a digitally sampled amplitude value of ultrasound backscatter data.

The term A-mode ultrasound as used herein is intended to mean a type of ultrasound pulse-echo technology wherein a single-element ultrasound transducer produces a single pulse of ultrasound energy which is emitted into a single location on the surface of an investigatory material. The A-mode transducer then listens for backscatter waveforms returning to the transducer from the originating pulse. The A-mode transducer then creates a one-dimensional finite-element data vector consisting of time-sampled backscatter amplitude values, also called an A-line. The A-mode vector of one-dimensional backscatter data should not be confused with two-dimensional, or higher dimensional, topological images of internal organs or internal material structures created by B-mode ultrasonic systems.

The term B-mode ultrasound as used herein is intended to mean a type of ultrasound pulse-echo technology wherein multiple transducers, or a single transducer mounted on a motor, produce a plurality of A-mode data vectors from the transducer's sweep across a material topologically in a horizontal or vertical direction, resulting in a two-dimensional pixelated image of internal body structures and bodily abnormalities and internal material structures. Each pixel in the B-mode image is formed from a single A-line received from a specific location on the surface of the investigated material. The brightness of a B-mode pixel in a B-mode image is derived by summing the amplitude values at all of the time-amplitude elements in the A-line, and displaying the aggregate amplitude value as the brightness (B-mode) of that pixel.

The term ultrasonic backscatter as used herein is intended to mean: the scattering of radiation or particles in a direction opposite to that of the incident radiation due to reflection from particles in the medium traversed and also due to signals redirected at material boundaries between material of unequal acoustic impedance.

The term classifying as used herein is intended to mean determining whether an entity belongs to a particular group of similar entities. A classifier is a machine or system or method that classifies.

The term data pruning as used herein is intended to mean cutting away data that is unwanted or superfluous. A-mode data vectors typically need pruning at the beginning of the vector (earliest time-stamps) where backscatter amplitudes are often so large that signal clipping occurs; and at the end of the vector (latest time-stamps) where backscatter amplitudes are often too small to be useful due to signal attenuation.

The term finite impulse response (FIR) digital filter as used herein is intended to mean a system or process known in the art that performs mathematical operations on a sampled, discrete-time signal to reduce or enhance certain aspects of that signal.

The term inference as used herein is intended to mean a conclusion or measured belief in a hypothesis that is formed because of known facts or evidence. An inference method is the process of passing from one proposition, statement, or judgment considered as true to another whose truth is believed to follow from that of the former. A-mode ultrasonic classification is a process in which classification of an investigatory material is inferred from evidence in the form of distinguishing data patterns and other characteristics (also called signatures) uncovered in ultrasonic A-mode data vectors through specialized computer-implemented processes.

The term signal envelope as used herein is intended to mean an envelope of an oscillating signal, which is a smooth curve outlining its extremes. An upper side-band envelope generalizes the concept of a constant amplitude. An A-mode ultrasonic signal envelope is a signal envelope constructed from A-mode ultrasonic backscatter data using techniques known in the art, such as an approximate Hilbert envelope.

The term symmetrized dot pattern (SDP) data array as used herein is intended to mean a data array resulting from an algorithm in the art, but modified by the present invention, that maps a normalized one-dimensional time-amplitude audio or speech waveform with (time, amplitude) coordinates into a two-dimensional data array with polar coordinates (r, theta). When the (r, theta) coordinate data array values are re-mapped into (x, y) pixels in a raster scan data array and display, the resulting data graphs (called polar echographs) are indicative of distinguishing characteristics in the original time-amplitude waveform. An SDP in the present application is constructed using an SDP mapping algorithm that has been modified from the art by: first receiving a vector of backscatter data in raw RF format from an A-mode ultrasound transducer; unpacking the input vector and normalizing the data into normal waveform positive and negative values; pruning the normalized vector of unwanted and superfluous data; constructing a single sideband amplitude envelope using an approximate Hilbert envelop algorithm known in the art; and reducing noise in the envelope data by applying a finite impulse response (FIR) digital filter, also known in the art.

The term ultrasonic waveform as used herein is intended to mean a representation of how alternating ultrasonic backscatter signal amplitude values vary with time.

The term ultrasound transducer as used herein is intended to mean a device that converts an electrical signal into ultrasonic waveform signals with frequencies above the threshold of human hearing, and which emits those ultrasound waveform signals into some material, and also listens for and converts received ultrasound backscatter waveform signals into electrical signals.

The term ultrasound as used herein is intended to mean waveforms of the same physical nature as sound but with frequencies much above the range of human hearing; typically greater than 10 Khz.

The term 'audio' as used herein is intended to mean waveforms of sound with frequencies within the range of human hearing; typically less than 10 Khz.

The term data array as used herein is intended to mean a data structure consisting of a collection of elements (values or variables), each identified by at least one array index or key. The simplest type of data structure is a linear array, also called one-dimensional array. One dimensional arrays may be plotted in Cartesian coordinates having two axes; an x axis horizontally and a y axis, y=f(x), vertically, or plotted in polar coordinates under a suitable transformation.

The term A-mode ultrasound vector as used herein is intended to mean a one-dimensional linear array with amplitude value of received backscatter plotted on the y axis and time since the originating ultrasonic pulse plotted on the x axis. Such plots are also known as echographs.

The term image, or more precisely raster image, as used herein is intended to mean a generally rectangular grid of gray-scale or colored pixels viewable via a monitor, paper, or other display medium. Raster images may also be stored in image files with varying formats. A gray-scale B-mode ultrasonic image is generally a raster image of internal material structures or human organs in which there are rows of horizontal pixels and columns of vertical pixels, and where the brightness of each pixel represents the total amplitude strength of backscatter received from the material location precisely below the precise horizontal/vertical location of an ultrasound probe/transducer.

DETAILED DESCRIPTION OF THE INVENTION—FIG. 1 TO FIG. 4

FIG. 1 is a block diagram illustrating one possible embodiment of an A-mode ultrasonic classifier apparatus into which the present disclosed computer-implemented method would be installed. Referring to FIG. 1, an enclosure (020) encapsulates individual components of the exemplary embodiment. The enclosure has an aperture (022) for installing a raster type visual display device (030). Alternatively, the enclosure may be configured without an enclosed visual display device, and in such a case the enclosure need not contain an aperture.

A single-board computer (024) is installed within the enclosure and is used for executing logic and control instructions specific to the present invention.

A raster type visual display device (if present) is mounted within the aperture within the enclosure and connected to the single-board computer.

Figure 2:
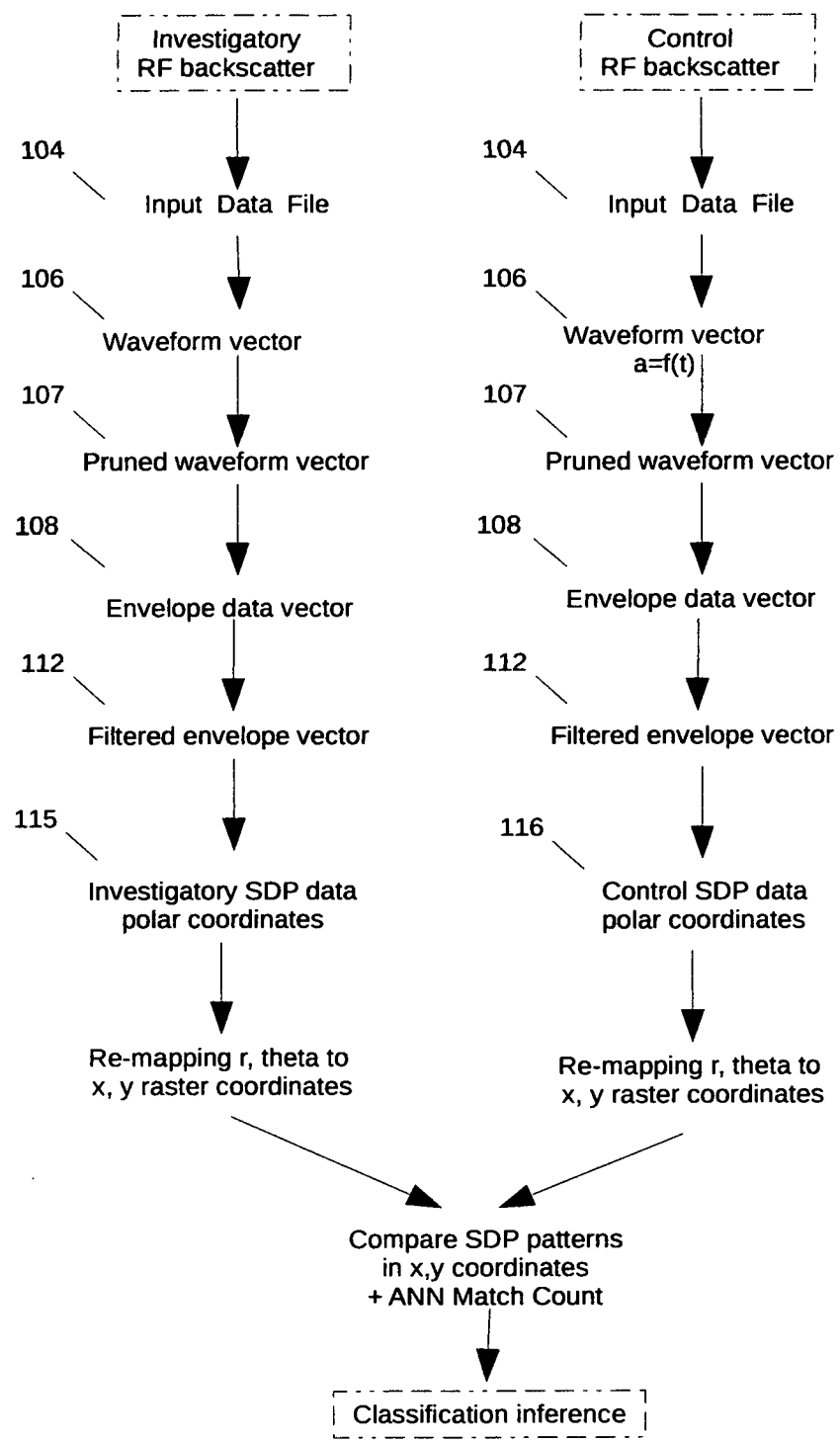
FIG. 2 is a block diagram illustrating an exemplary data model for the computer-implemented process of the present invention.

FIG. 2 is a block diagram illustrating an exemplary data model for the disclosed computer-implemented method, summarizing primary data entities.

Referring to FIG. 2, in the left-hand column, an input data file (104) contains A-mode backscatter data received from an investigatory material. The input data file is then transformed, if necessary, into a normalized waveform 106. The normalized waveform is then pruned of unwanted data at the head of the vector and at the tail of the vector, resulting in a pruned vector 107. An amplitude envelope 108 is then constructed using the upper side band of the pruned vector. The amplitude envelope is then filtered to reduce noise, resulting in a filtered envelope vector 112. The filtered envelope vector is then mapped into an investigatory SDP data array. Referring to the right hand column, an input file is received from a control material of known classification. The control input vector is then normalized, and then pruned, and then transformed into an amplitude envelope, and then filtered, and then mapped into a control SDP data array. Finally, the investigatory SDP data array and the control SDP data array are re-mapped into raster type horizontal and vertical aligned pixels, and the investigatory pixels 115 are compared to the control pixels 116 to determine a measure of backscatter data similarity which is then used to construct a classification inference as output.

Figure 3:
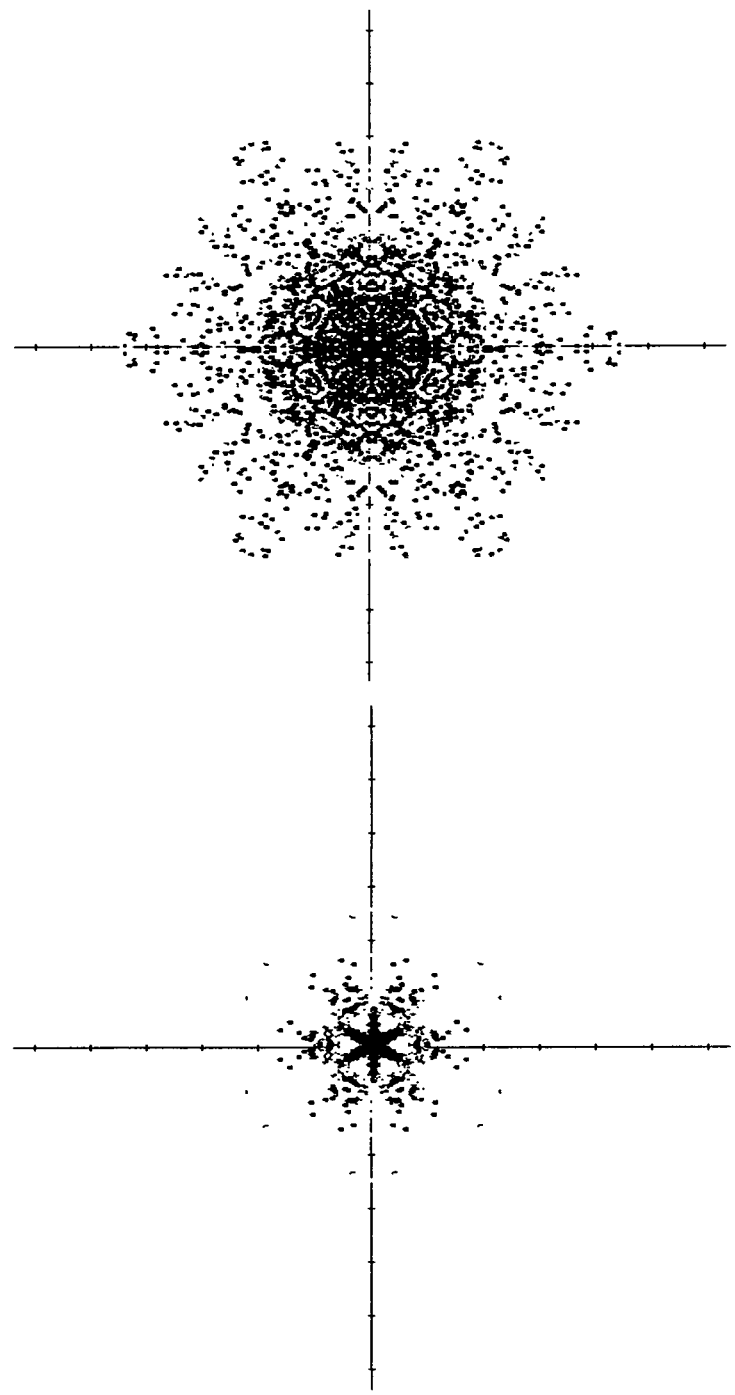
FIG. 3 is an illustration of visualized symmetrized dot pattern (SDP) data arrays using A-mode ultrasonic backscatter data and the computer-implemented mprocess of the present invention.

Referring to FIG. 3, for illustration purposes, the SDP plot on the top of the sheet is constructed from an A-mode backscatter data array obtained from a control material of known classification, and the SDP plot on the bottom of the sheet is constructed from an A-mode backscatter data array obtained from a material of unknown classification. It should be appreciated that upon visual inspection it can be seen that the investigatory material does not likely belong in the control material classification.

Figure 4:
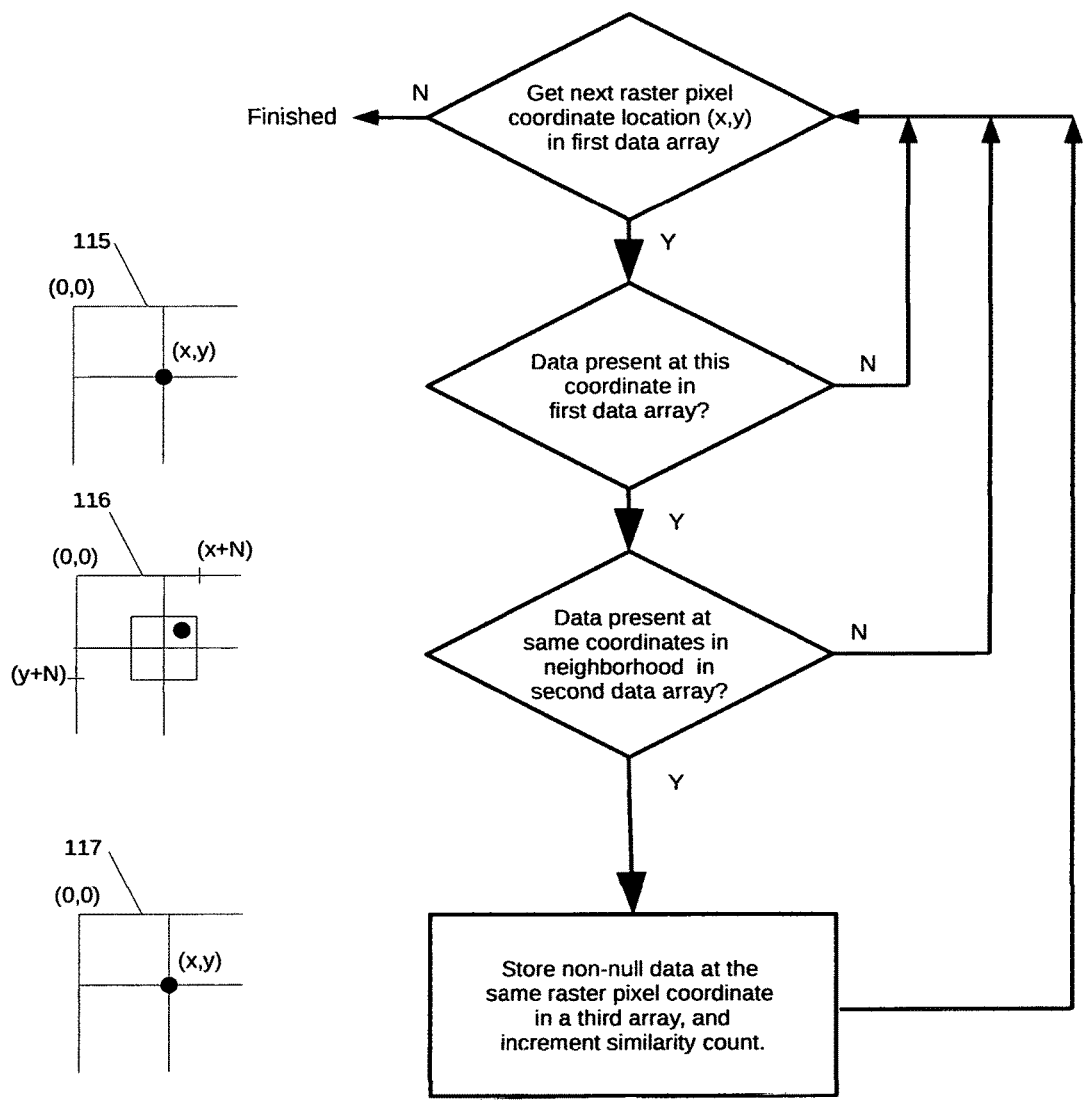
FIG. 4 is a flow chart illustrating steps for comparing an investigatory material SDP data array and a control material SDP data array.

FIG. 4 is a flow chart illustrating the process step for a computer implemented non-visual comparison of a raster formatted SDP data array from an investigatory material to a raster formatted SDP data array from a control material. Referring to FIG. 4, the steps consist of:

for each raster pixel-coordinate location (x, y) in the investigatory SDP data array (115),
if there is a not-null data value present at the investigatory SDP buffered image data array, and if there is at least one not-null data value present in a corresponding neighborhood of pixels in the control SDP buffered image data array (116), then
placing a not-null data value at the same (x, y) coordinates in SDP difference data array 117, and incrementing a similarity count. At the end of this sub-process, the higher the similarity count, the more likely it is that the investigatory material and the control material belong to the same class.

CONCLUSIONS, RAMIFICATIONS, AND SCOPE

Accordingly, the reader will see that the present invention advances the prior art by providing a new method of classifying investigatory materials, by identifying and extracting distinguishing characteristics and patterns in A-mode ultrasound backscatter data that are indicative of material classification or identity.

It is anticipated therefore that use of the invention will result in faster and more accurate inferences concerning classification of ultrasonically permeable materials using A-mode ultrasound systems.

Although the description contains many specifications, these should not be construed as limiting the scope of the invention The scope of the invention should be determined by the appended claims and their legal equivalents, rather than by the examples given.

The invention claimed is:

1. A computer-implemented process stored on a non-transitory computer-readable medium for classifying investigatory material using as input A-mode ultrasound backscatter data, comprising transforming a received liner array vector of A-mode ultrasound backscatter data from an investigatory material into a two-dimensional symmetrized dot pattern data array and then extracting and using distinctive data patterns in the two-dimensional symmetrized dot pattern array that are indicative of material identity to classify a material of uncertain classification, executing on a processor the steps of:

(a) receiving a control material input data file (104) in the memory of the computer where said control material input data file is comprised of time-sampled digitized radio frequency (RF) backscatter amplitude values obtained from an A-mode ultrasonic transducer and related to a control material of known classification;

(b) creating a normalized control vector (106) from said control material input data file, by normalizing the elements of the input data file received in step (a), if needed, so that the input data file values are all signed integers resembling a normal oscillating amplitude waveform;

(c) creating a pruned normalized control vector (107) from step (b) by removing unwanted and superfluous time-sampled amplitude data values at the beginning of the vector where there is excessive noise at the point of entry of an A-mode ultrasound beam, and also by removing time-sampled data at the end of the vector where little signal remains due to the effects of attenuation;

(d) creating a control amplitude signal envelope data vector (108) from the pruned normalized control vector of step (c), by using a digital signal processing technique known in the art as an approximate Hilbert envelope;

(e) creating a filtered control amplitude signal envelope data vector (112) from the envelope vector in step (d), by applying a digital signal processing technique known in the art as a finite impulse response (FIR) digital filter;

(f) creating a control material data array (116) from the one-dimensional filtered control signal envelope vector of step (e), by applying a first data mapping technique known in the art as a symmetrized dot pattern (SDP) in which each time sample amplitude value in the vector produced in step (e) maps into a scaled radius value and scaled angle value, followed by a second mapping technique that maps the radius and theta SDP values into raster type x, y coordinates for use in step (n);

(g) receiving an investigatory material input data file (104) in the memory of the computer where said input file contains a control vector comprised of time-sampled digitized radio frequency (RF) backscatter amplitude values obtained from an A-mode ultrasonic transducer and related to an investigatory material of uncertain classification;

(h) creating a normalized investigatory vector (106) from said investigatory input data file, by normalizing the elements of the input data file received in step (g), if needed, so that the input data file values are all signed integers resembling a normal oscillating amplitude waveform;

(i) creating a pruned normalized investigatory vector (107) from step (h) by removing unwanted and superfluous time-sampled amplitude data at the beginning of the vector where there is excessive noise at the point of entry of an A-mode ultrasound beam, and also removing time-sampled data at the end of the vector where little signal remains due to the effects of attenuation;

(j) creating an investigatory amplitude signal envelope data vector (108) from the pruned normalized investigatory vector of step (i), by using a digital signal processing technique known in the art as an approximate Hilbert envelope;

(k) creating a filtered investigatory amplitude signal envelope data vector (112) from the envelope vector in step (j), by applying a digital signal processing technique known in the art as a finite impulse response (FIR) digital filter;

(l) creating an investigatory material data array (115) from the one-dimensional filtered investigatory signal envelope vector of step (k), by applying a first data mapping technique known in the art as a symmetrized dot pattern (SDP) in which each time sample amplitude value in the vector produced in step (k) maps into a scaled radius value and scaled angle value, followed by a second mapping technique that maps the radius and theta SDP values into raster type x, y coordinates for use in step (n);

(m) creating an empty SDP difference array (117) that will be used to compare identity-related discriminating characteristics in the control SDP data array (116) with identity-related discriminating characteristics in the investigatory SDP data array (115);

(n) measuring the similarity between the control SDP data array (116) and the investigatory SDP data array (115), by applying a technique known in the art as approximate next-nearest neighbor (ANN), which is comprised of the steps of determining, for each ordered coordinate pair in the SDP investigatory data array (115), where there is a not-null SDP value stored, determining if there is a corresponding not-null SDP value stored in a nearby neighborhood of the same ordered pair coordinates in the control SDP array (116), and if so recording a not-null value at the same ordered pair coordinates in the SDP difference array (117) and also incrementing a similarity match count total;

(o) outputting a classification decision concerning the investigatory material based on the following inference logic: a high value ANN similarity match count total implies that it is likely that the investigatory material belongs to the same class as the control material; a low ANN similarity count implies that it is likely that the investigatory material does not belong to the same class as the control material; a match count that is neither high nor low implies that the classification of the investigatory material is uncertain.

2. A data processing apparatus/device/system comprising a processor adapted to/configured to perform the steps of the method of claim 1.

3. A computer program product comprising instructions stored on a non-transitory computer readable medium which, when the program is executed by a computer, cause the computer to carry out the steps of the method of claim 1.

4. A non-transitory computer-readable data carrier having stored thereon the computer program of claim 3.

* * * * *